(12) United States Patent
Atarius et al.

(10) Patent No.: US 8,315,190 B2
(45) Date of Patent: Nov. 20, 2012

(54) METHOD AND APPARATUS FOR INTERWORKING BETWEEN PUSH-TO-TALK OVER CELLULAR (POC) SYSTEMS AND INSTANT MESSAGING (IM) SYSTEMS

(75) Inventors: Roozbeh Atarius, San Diego, CA (US); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1671 days.

(21) Appl. No.: 11/341,937

(22) Filed: Jan. 26, 2006

(65) Prior Publication Data

US 2006/0212525 A1     Sep. 21, 2006

Related U.S. Application Data

(60) Provisional application No. 60/648,092, filed on Jan. 28, 2005.

(51) Int. Cl.
*H04L 12/16* (2006.01)

(52) U.S. Cl. .................. 370/263; 370/352; 455/517

(58) Field of Classification Search .................. 340/278, 340/285, 322, 328, 352, 401, 433, 443, 447, 340/461, 462–467, 493; 370/260, 263, 273, 370/352, 528; 455/509, 517–518
See application file for complete search history.

(56) References Cited

U.S. PATENT DOCUMENTS

| | | | |
|---|---|---|---|
| 6,430,602 B1* | 8/2002 | Kay et al. ...................... | 709/206 |
| 6,763,226 B1* | 7/2004 | McZeal, Jr. .................. | 455/90.2 |
| 2004/0198376 A1 | 10/2004 | Chandhok et al. | |
| 2004/0224710 A1* | 11/2004 | Koskelainen et al. ........ | 455/518 |
| 2005/0135348 A1* | 6/2005 | Staack .......................... | 370/353 |
| 2006/0058052 A1* | 3/2006 | Plestid et al. ................. | 455/519 |
| 2006/0088065 A1* | 4/2006 | Khatter ......................... | 370/352 |

(Continued)

FOREIGN PATENT DOCUMENTS

JP     2004053570 A     2/2004

(Continued)

OTHER PUBLICATIONS

Medman, N. et al. "Ericsson Instant Talk" Ericsson Review No. 1, 2004, pp. 16-19, Stockholm, SE XP001217353.

(Continued)

*Primary Examiner* — Ricky Ngo
*Assistant Examiner* — Phuongchau B Nguyen
(74) *Attorney, Agent, or Firm* — Kristine U. Ekwueme

(57) ABSTRACT

A method and apparatus for interworking between push-to-talk over cellular (PoC) systems and instant messaging (IM) systems is provided. An interworking entity that behaves like a PoC client to a PoC server and as an IM client to the IM server is provided. The interworking entity may be implemented as part of the PoC server or the IM server. The interworking entity listens to talk bursts from the PoC server and when it receives a talk burst the interworking entity sends the message to the IM client via the IM server. In an embodiment, the interworking entity listens to talk bursts or audio clips from the IM server and when it receives them, stores them in a temporary storage memory and converts them to a streaming format. The interworking entity then requests the floor from the PoC server, and, once the floor is granted, streams the stored audio clip or talk burst to the PoC server. The PoC server then distributes the clips to the PoC clients.

21 Claims, 6 Drawing Sheets

U.S. PATENT DOCUMENTS

| | | | |
|---|---|---|---|
| 2006/0105792 A1* | 5/2006 | Armbruster et al. | 455/517 |
| 2006/0154681 A1* | 7/2006 | Park et al. | 455/518 |
| 2007/0133435 A1* | 6/2007 | Eneroth et al. | 370/260 |

FOREIGN PATENT DOCUMENTS

| | | |
|---|---|---|
| WO | WO03069928 | 8/2003 |
| WO | WO2004062191 A2 | 7/2004 |
| WO | WO2004100581 | 11/2004 |
| WO | 2005006650 | 1/2005 |

OTHER PUBLICATIONS

International Search Report and Written Opinion—PCT/US2006/003202, International Search Authority—European Patent Office—May 18, 2006.

* cited by examiner

METHOD AND APPARATUS FOR INTERWORKING BETWEEN PUSH-TO-TALK OVER CELLULAR (POC) SYSTEMS AND INSTANT MESSAGING (IM) SYSTEMS

CLAIM OF PRIORITY UNDER 35 U.S.C. §119

The present application for patent claims priority to Provisional Application No. 60/648,092 entitled "Method and Apparatus for Interworking Between Push-to-Talk over Cellular (PoC) Systems and Instant Messaging (IM) Systems" filed Jan. 28, 2005, and assigned to the assignee hereof and hereby expressly incorporated by reference herein.

BACKGROUND

1. Field

The present invention relates generally to communications and more particularly, to a method and apparatus for interworking between push-to-talk over cellular (PoC) systems and instant messaging (IM) systems.

2. Background

Wireless communication systems have seen significant growth in recent years with increases in subscribers and utilization. This growth has prompted operators to seek to offer additional features and services to subscribers. Examples of new features that many operators offer to subscribers include: music downloads, video services, push-to-talk over cellular (PoC), and instant messaging service (IM). PoC and IM services have been especially popular.

FIG. 1 is a block diagram that shows a Push-to-Talk over Cellular (PoC) service and an Instant Messaging (IM) service, both operating in a wireless communication system 100.

An Instant Messaging (IM) client 108 uses an IM service to exchange messages with other IM clients 108. Even though IM service was developed to exchange text based information, there is no restriction to carrying other types of information such as audio clips, images etc. Also, there is no restriction on a user regarding what to transmit and when to transmit. Typically the information is not streamed from the sender to receiver.

A Push-to-Talk over Cellular (PoC) service establishes a half-duplex audio communication channel between a group of PoC users or clients 104. At most one member of a PoC group has the right to transmit at any time and all other members receive the transmitted information. A floor control mechanism is used to arbitrate requests for the right to transmit from different members of the group. The talk burst generated by the sender is packetized and then streamed to the receivers.

Since it is possible to transmit audio clips using IM service, it would be beneficial if the PoC service could work with IM service. However, differences between these services have prevented a PoC service and an IM service from working together. Floor control is used in PoC service to ensure that only one client transmits audio packets at a time. In contrast, IM service has no concept of floor control, as each member of an IM group may transmit at any time. The PoC service packetizes the audio and then streams the audio to other participants. This is not the case in the IM service, where the IM client buffers the audio packets and creates an audio clip which is then distributed to other IM session participants. Since it is possible and desirable to transmit audio clips using the IM service it would be beneficial if the PoC service could work together with the IM service.

Thus, there is a need in the art for a method and apparatus for interworking between push-to-talk cellular systems and instant messaging systems.

SUMMARY

In one aspect of the invention a method of transmitting a message is provided. The method comprises the steps of generating a message in a first communication system; sending the message to a server in the first communication system; sending the message to an interworking entity; storing the message at the interworking entity; converting the message to a streaming format; requesting a floor from a second communication system of a different type than the first communication system; streaming the message to a server in the second communication system; and distributing the message to a terminal in the second communications system.

Another embodiment provides method of transmitting a message between two communication systems, where one communication system utilizes floor control. The method comprises the steps of: generating a message in a first communication system; sending the message to a server in the first communication system; sending the message to an interworking entity; storing the message; converting the message to a streaming format; requesting a floor from a second communication system; streaming the message to a server in the second communication system; and distributing the message to a terminal in the second communication system.

Yet another embodiment provides a method of transmitting a message, the method comprising: generating a message in a first communication system; sending the message to a server in the first communication system; sending the message to an interworking entity; storing the message; converting the message to a streaming format; streaming the message to a server in the second communication system; and distributing the message to a terminal in the second communications system.

An apparatus for transmitting a message is also provided, the apparatus comprising: means for generating a message in a first communication system; means for sending the message to a server in the first communication system; means for sending the message to an interworking entity; means for storing the message at the interworking entity; means for converting the message to a streaming format; means for requesting a floor from a second communication system; means for streaming the message to a server in the second communication system; and means for distributing the message to a terminal in the second communications system.

Yet another embodiment provides an apparatus for transmitting comprising: means for generating a message in a first communication system; means for sending the message to a server in the first communication system; means for sending the message to an interworking entity; means for storing the message at the interworking entity; means for converting the message to a streaming format; means for generating at least one additional message in the first communication system; means for sending the at least one additional message to the server in the first communication system; means for sending the at least one additional message to the interworking entity; means for storing the at least one additional message; means for converting the at least one additional message to the streaming format; means for placing the message and the at least one additional message in a queue; means for requesting the floor from a second communication system; means for streaming the message to a server in the second communication system; means for distributing the message to at least one terminal in the second communication system; means for determining if the queue contains at least one additional message; means for requesting the floor if the queue contains at least one additional message; means for streaming the at least one additional message to the server in the second communications system; and means for distributing the at least one additional message to at least one terminal in the second communication system.

A computer-readable medium is also provided. This computer-readable medium including computer-executable instructions comprising: generating a message in a first communication system; sending the message to a server in the first communication system; sending the message to an interworking entity; storing the message; converting the message to a streaming format; requesting a floor from a second communication system; streaming the message to a server in the second communication system; and distributing the message to a terminal in the second communications system.

A further embodiment provides computer-readable medium including computer-executable instructions comprising: generating a message in a first communication system; sending the message to a server in the first communication system; sending the message to an interworking entity; storing the message; converting the message to a streaming format; requesting a floor from a second communication system; streaming the message to a server in the second communication system; and distributing the message to a terminal in the second communications system.

DETAILED DESCRIPTION

Overview

The word "exemplary" is used herein to mean "serving as an example, instance, or illustration." Any embodiment described herein as "exemplary" is not necessarily to be construed as preferred or advantageous over other embodiments.

Figure 1:
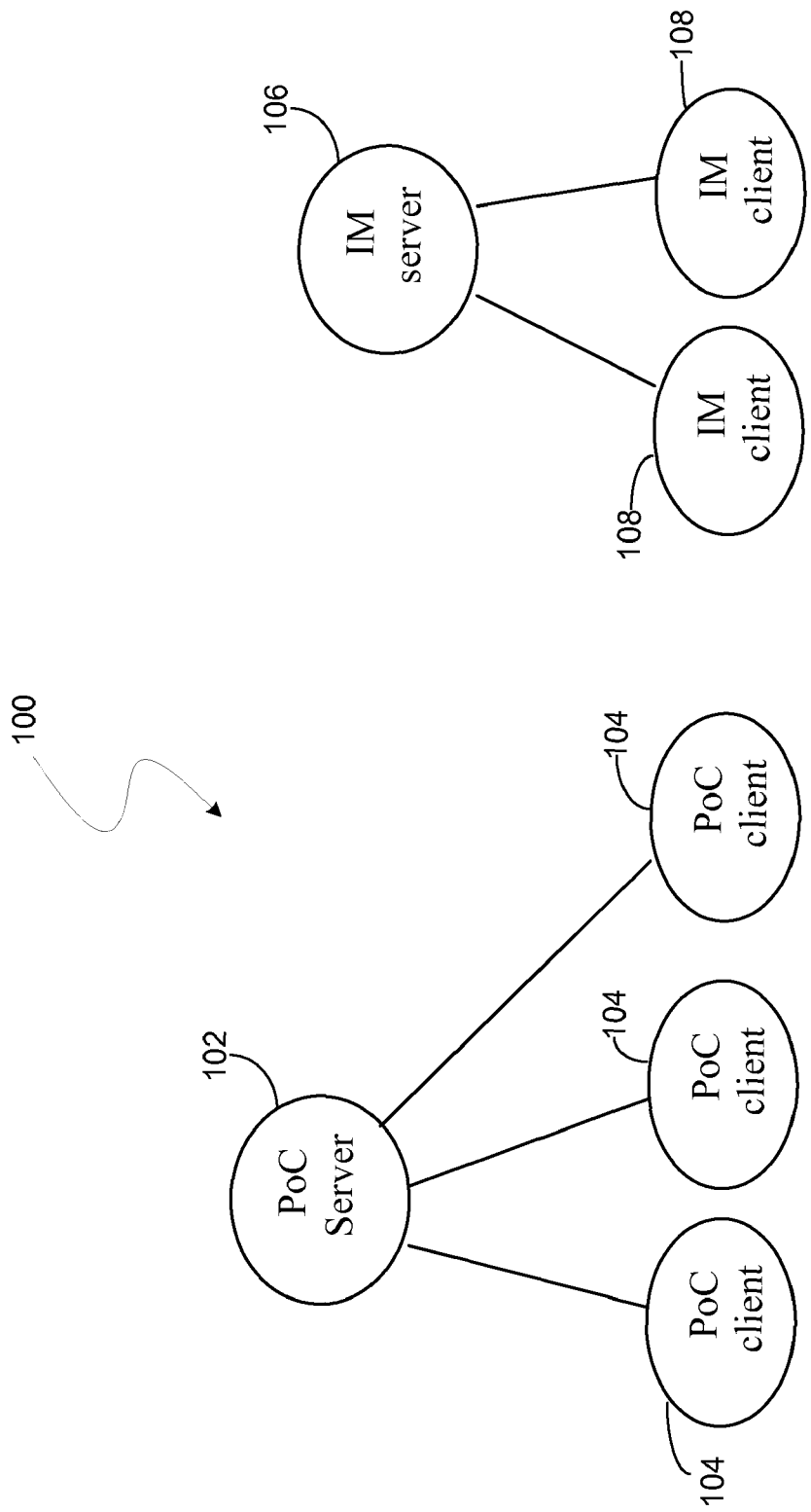
FIG. 1 is a block diagram that shows a PoC service and an IM service in a prior art wireless communication system.

There are some fundamental differences between PoC services and IM services. As noted above and shown in FIG. 1, PoC service uses floor control such that a PoC server 102 will only distribute audio packets received from a group member that has the floor. The PoC server 102 it will discard audio packets received from other members of the group. A client must request and be granted the floor before it can transmit audio packets. A client may be a mobile terminal or other communication device. In contrast, the IM service has no concept of floor control. Each member of an IM group is able to transmit at any time. In addition, the PoC client 104 packetizes audio into packets and streams them to the other participants. In direct contrast, the IM client 108 typically buffers the audio packets and creates an audio clip which is then distributed to the other participants in the IM session. Thus, the delays experienced by the users of IM service are typically higher than those experienced by the PoC users. To allow a PoC service to work with an IM service (and vice-versa), techniques are needed to overcome the hurdles posed by the floor control protocol and the streaming nature of the audio in the PoC service.

Figure 2:
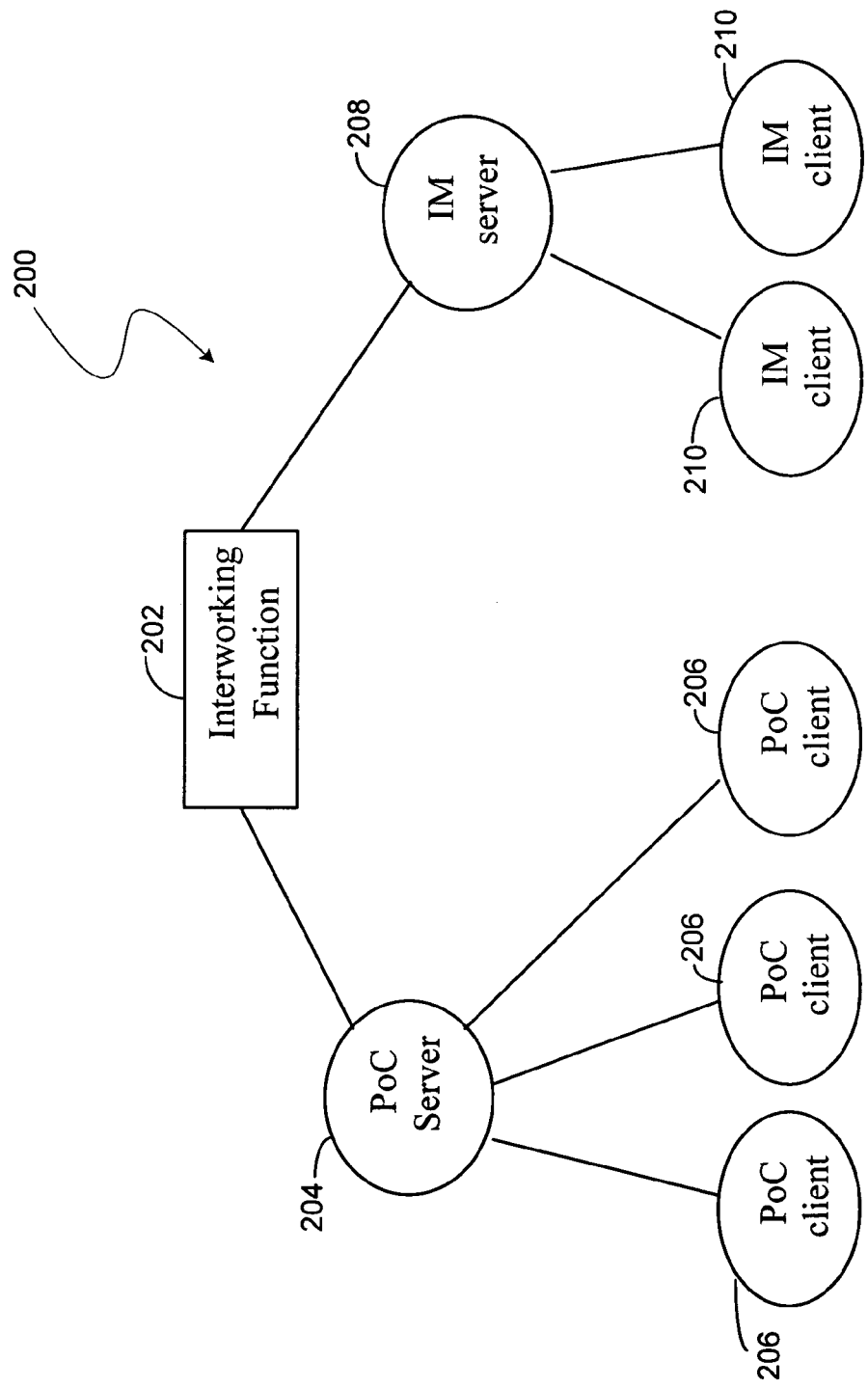
FIG. 2 is a block diagram that shows a PoC service, an IM service and an interworking entity according to one embodiment.

FIG. 2 is a block diagram that shows a PoC service, an IM service and an interworking entity in a wireless communication system, 200, according to one embodiment.

Embodiments disclosed herein address the above stated needs by providing techniques which allow a PoC client 206 and an IM client 210 to conduct a voice conversation with each other. An aspect of the invention relates to a new functional entity, referred to herein as an interworking entity, that behaves like a PoC client 206 to a PoC server 204 and as an IM client 210 to the IM server 208. In one embodiment, mechanisms are provided for interworking between a service with floor control, such as PoC, and a service without floor control, such as IM. A new interworking entity 202 requests floor control for clients without this functionality. The concept of floor control is thus maintained.

Embodiments described herein relate to an interworking function (IF) that allows audio clips generated by an IM client 210 to be delivered to a PoC client 206. This interworking function also allows talk bursts generated by a PoC client 206 to be delivered to an IM client 210. No changes are required in the interface between PoC client 206 and the PoC server 204; similarly, no changes are required in the interface between IM server 208 and the IM client 210. The PoC server 204 or/and to the IM server 208, may need to be modified to support this new functionality. Moreover, the new functionality may be implemented by adding a separate unit interfacing both the PoC server 204 and the IM server 208. To the PoC client 206, the session appears to be a PoC session, whereas for the IM client 210, the session appears to be an IM session.

Example

Figure 3:
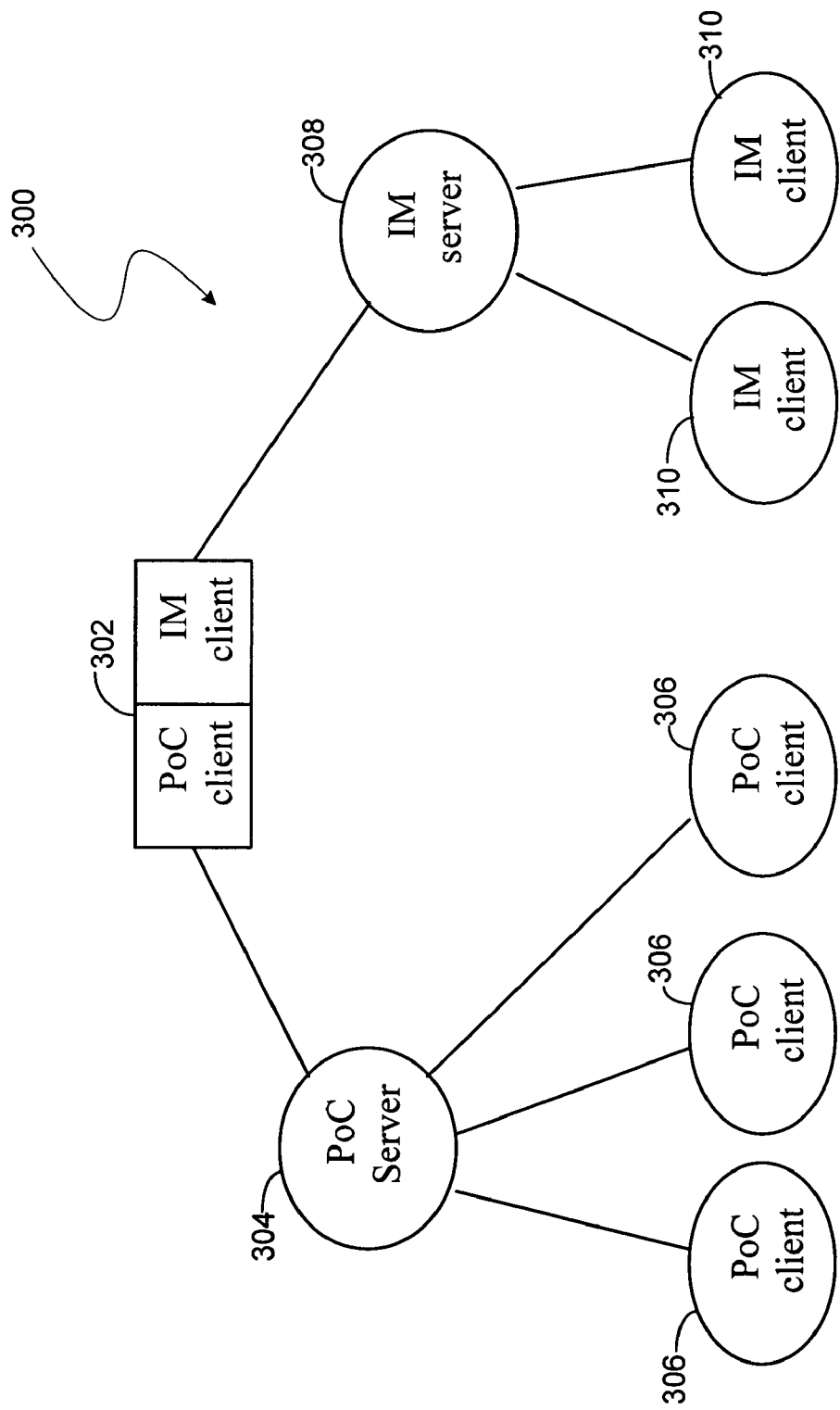
FIG. 3 is a block diagram that shows a PoC service, an IM service and an interworking entity that behaves like a PoC client to a PoC server and as an IM client to the IM server, according to one embodiment.

FIG. 3 is a block diagram that shows a PoC service, an IM service and an interworking entity 302 that behaves like a PoC client 306 to a PoC server 304 and as an IM client 310 to the IM server 308. The interworking entity 302 described above can be implemented as part of the PoC server 304, part of the IM server 308, or as a separate entity that is in communication with both the PoC server 304 and the IM server 308. To the PoC server 304, this functional entity acts as a PoC client 306 and to the IM server 308 it acts like an IM client 310. Regardless of the implementation, this interworking entity performs several functions.

For example, the interworking entity 302 listens to talk bursts from the PoC server 304 and when it receives a talk burst, it sends the talk burst to all the IM clients 310 via the IM server 308. This operation can be performed without significant delay.

In one embodiment, interworking entity 302 can listen to audio clips or talk bursts from IM server 308. When interworking entity 302 receives audio clips or talk bursts from the IM server 308 it can store them in temporary storage, and convert the audio clip to streaming format. The interworking entity 302 then requests the floor from the PoC server 304, and when the floor is granted, interworking entity 302 can stream the stored audio clip to the PoC server 304 to be distributed to the PoC client 306. When the audio clip streaming is complete, interworking entity 302 releases the floor and deletes the stored audio clip.

Since there is a delay between when an audio clip or a talk burst is received from an IM client 310 and when this audio clip or talk burst is transmitted to the PoC server 304, it is possible for multiple audio clips or talk bursts to arrive in quick succession. In another embodiment, the conversion function can instead be performed in parallel with the streaming function. The interworking entity can store multiple audio clips received from the other IM clients 310 in a queue and transmit the stored audio clips after obtaining the floor from the PoC server 304

Figure 4:
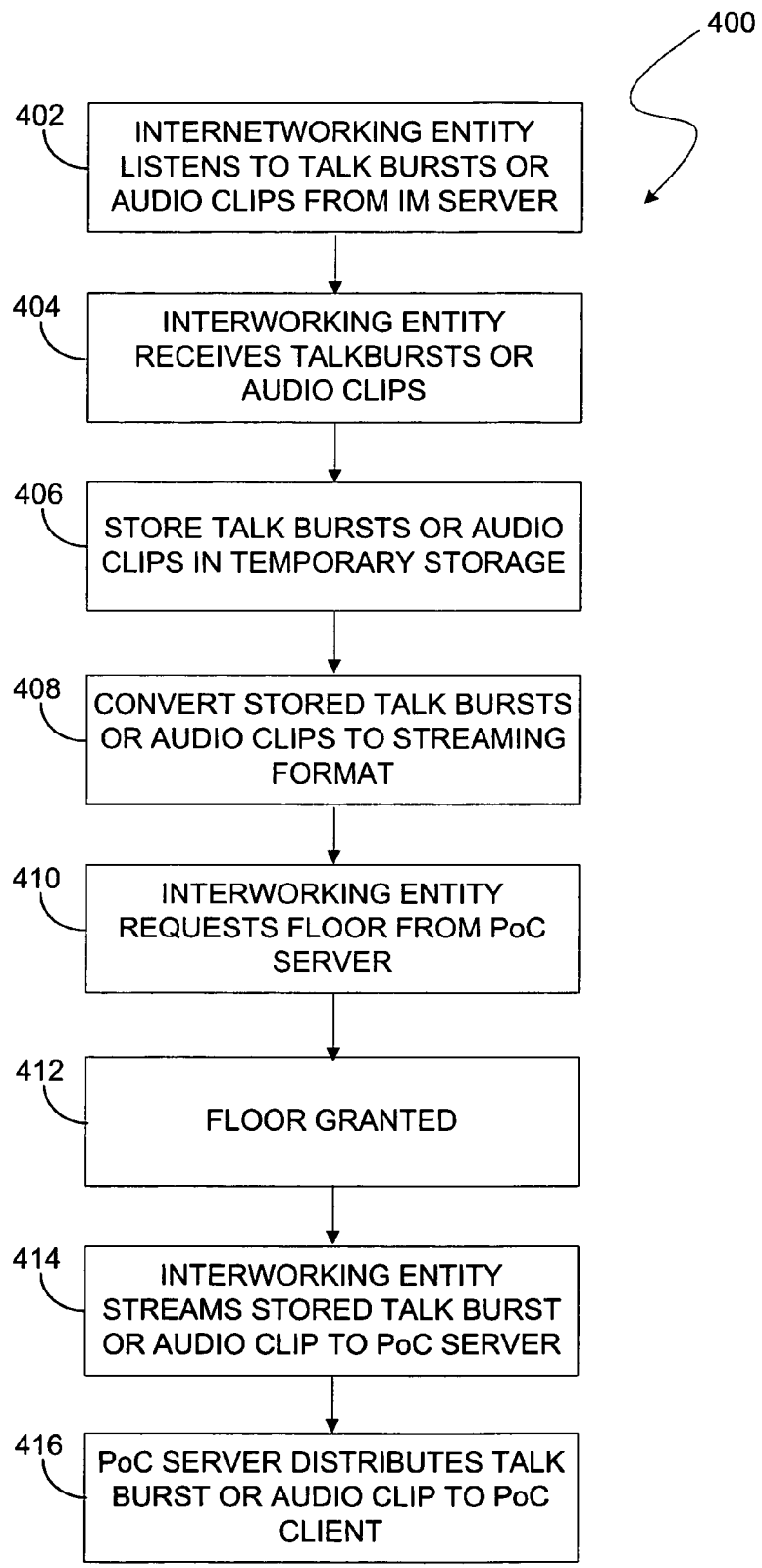
FIG. 4 is a flow diagram illustrating operation of the interworking entity according to one embodiment.

FIG. 4 is a flow diagram of an embodiment of the invention. The method, 400, begins in step 402 when the interworking entity 302 listens to talk bursts or audio clips from an IM server, 308. The interworking entity receives the talk bursts or audio clips in step 404. Upon receipt, these talk bursts or audio clips are stored in a temporary storage memory in step 406. The interworking entity 302 converts the stored talk bursts or audio clips to a streaming format in step 408. Once the conversion to streaming format has taken place, interworking entity 302 requests the floor from a PoC server 304 in step 410. In step 412 the PoC server 304 grants the floor to interworking entity 302. Upon receipt of the floor, interworking entity 302 streams the converted talk bursts or audio clips to the PoC server 304 in step 414. The PoC server 304 distributes the talk bursts or audio clips to the PoC client(s) 306 in step 416.

Implementation Part of the PoC Server

When the interworking function 302 is implemented as part of the PoC server 304, the PoC server 304 manages the floor on behalf of the group members. When a client wishes to transmit a talk burst, it sends a talk burst request to the IM server. Since the IM clients 310 can not request the floor, the interworking entity 302 can make such a request on behalf of the IM clients. The floor requests submitted on behalf of the IM clients 310, as well as those submitted by the PoC clients 306, can be treated by the PoC server 304 according to local policy.

In order to keep the floor control concept, the interworking entity 302 receives the audio clips from the IM clients 310, queues them and then generates the floor requests to the PoC server 304 on the behalf of the IM client 310 that sent the audio clip.

The interworking entity 302 (described above) maintains a queue of audio clips to be sent to the PoC server 304. When the interworking entity 302 receives an audio clip from one of the IM clients 310, the received audio clip is placed in this queue. If this queue contains only one entry, then the interworking entity 302 sends a floor request to the PoC server 304. While the floor request is pending, subsequent audio clips received from other IM clients 310 can be entered in the queue; however, no subsequent floor request is sent as there is already a floor request pending.

When the PoC server 304 grants the floor to this interworking entity 302, it removes the first audio clip from the queue and streams it to the PoC server 304. Once the transmission is completed, the interworking entity 302 may provide an acknowledgement to the IM client 310 that originated the audio clip. Then, if the queue contains at least one more audio clip, the interworking entity 302 makes a request for the floor to the PoC server 304.

Figure 5:
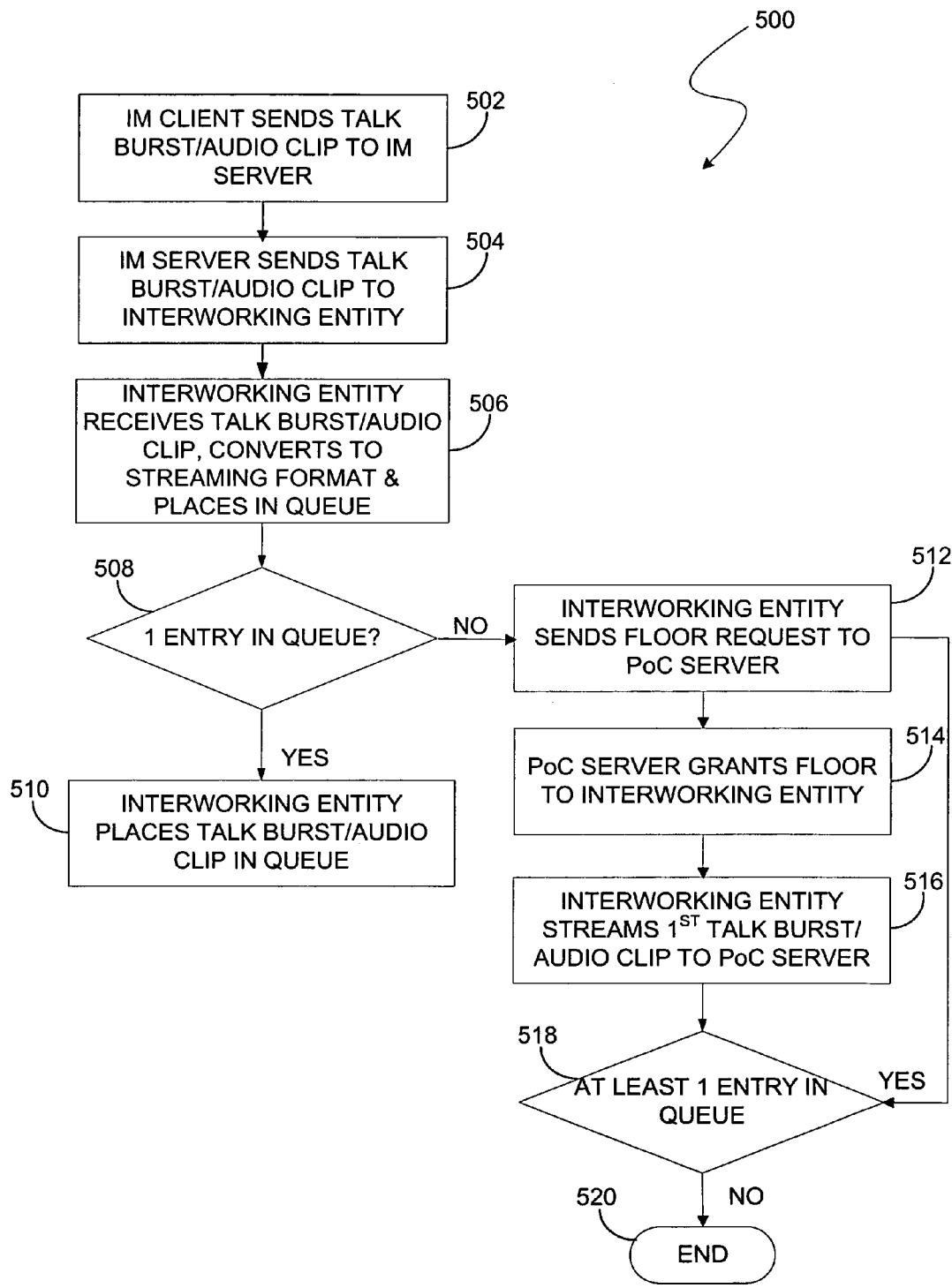
FIG. 5 is a flow diagram illustrating operation of the interworking entity according to another embodiment.

FIG. 5 is a flowchart of the steps of a method of implementing the interworking entity as part of a PoC server. The method, 500, begins when an IM client sends a talk burst or audio clip to an IM server in step 502. The IM server sends the talk burst or audio clip to the interworking entity in step 504. In step 506 the interworking entity receives the talk burst or audio clip, converts it to a streaming format and places it in a queue. In step 508, the queue is analyzed to determine if more than one entry is in the queue. If there is at least one entry in the queue, the talk burst or audio clip is placed in the queue in step 510. If there is not an entry in the queue, the interworking entity sends a floor request to the PoC server in step 512. The PoC server grants the floor to the interworking entity in step 514. Once the floor is granted, in step 516 the interworking entity streams the first talk burst or audio clip to the PoC server for delivery to the client. After the talk burst or audio clip has been streamed the interworking entity again analyzes the queue in step 516 to determine if there is at least one entry remaining in the queue. If there is at least one entry remaining in the queue, processing returns to step 512. If no entries remain in the queue, processing ends.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Figure 6:
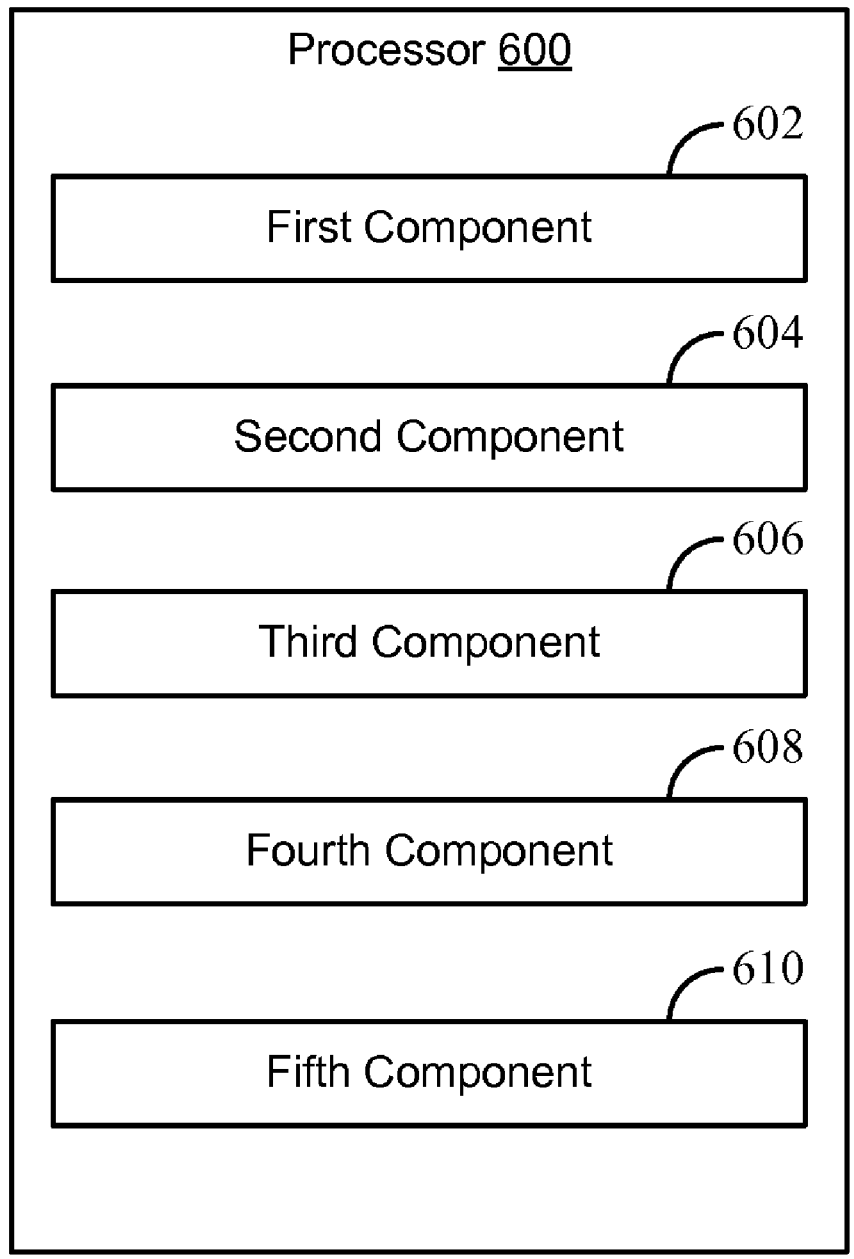
FIG. 6 is a block diagram of an aspect of at least one processor, according to one embodiment.

Referring to FIG. 6, for example, in an aspect, at least one processor 600 may include a first hardware component 602 for receiving, at an interworking entity, a message from a first terminal in an instant messaging (IM) system, wherein the message does not include floor signaling. Processor 600 may also include a second component 604 for queuing the message in a temporary storage. In addition, processor 600 may include a third component 606 for converting the message to a streaming format. Processor 600 may also include a fourth component 608 for automatically requesting a floor from a push-to-talk over cellular (PoC) system based on the converting. Processor 600 may further include a fifth component 610 for streaming the message to a server in the push-to-talk over cellular (PoC) system upon receipt of the floor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope.

What is claimed is:

1. A method of transmitting a message, the method comprising:
    receiving, at an interworking entity, a message from a first terminal in an instant messaging (IM) system, wherein the message does not include floor signaling;
    queuing the message in a temporary storage;
    converting the message to a streaming format;
    automatically requesting, at the interworking entity, a floor from a push-to-talk over cellular (PoC) system based on the converting; and
    streaming, at the interworking entity, the message to a server in the push-to-talk over cellular (PoC) system upon receipt of the floor.

2. The method of claim 1, where the interworking entity is implemented in an instant messaging (IM) server.

3. The method of claim 1, where the interworking entity is implemented in a push-to-talk (PoC) server.

4. The method of claim 1, where the interworking entity is implemented as a separate entity in communication with both an instant messaging (IM) server and a push-to-talk over cellular (PoC) server.

5. The method of claim 1, where converting the message to a streaming format is performed in parallel with streaming the message to the server in the push-to-talk over cellular (PoC) system.

6. The method of claim 1, wherein requesting the floor occurs based on completion of the converting.

7. The method of claim 1, further comprising:
    releasing the floor; and
    deleting the message from the temporary storage.

8. The method of claim 1, further comprising:
    queuing the message if the floor is not granted.

9. The method of claim 1, further comprising:
    wherein the receiving further comprises receiving a plurality of messages from a plurality of terminals;
    queuing the plurality of messages;
    wherein the requesting of the floor further comprises requesting for a first one of the plurality of messages;
    releasing the floor for the first one of the plurality of messages; and
    requesting the floor for a second one of the plurality of messages based on the releasing.

10. An apparatus for transmitting a message, the apparatus comprising:
    means for receiving, at an interworking entity, a message from a first terminal in an instant messaging (IM) system, wherein the message does not include floor signaling;
    means for queuing the message in a temporary storage;
    means for converting the message to a streaming format;
    means for automatically requesting, at the interworking entity, a floor from a push-to-talk over cellular (PoC) system based on the converting; and
    means for streaming, at the interworking entity, the message to a server in the push-to-talk over cellular (PoC) system upon receipt of the floor.

11. A non-transitory computer-readable medium including computer-executable instructions comprising:
    receiving, at an interworking entity, a message from a first terminal in an instant messaging (IM) system, wherein the message does not include floor signaling;
    storing queuing the message in a temporary storage;
    converting the message to a streaming format;
    automatically requesting, at the interworking entity, a floor from a push-to-talk over cellular (PoC) system based on the converting; and
    streaming, at the interworking entity, the message to a server in the push-to-talk over cellular (PoC) system upon receipt of the floor.

12. At least one processor, comprising:
    a first hardware component for receiving, at an interworking entity, a message from a first terminal in an instant messaging (IM) system, wherein the message does not include floor signaling;
    a second component for queuing the message in a temporary storage;
    a third component for converting the message to a streaming format;
    a fourth component for automatically requesting, at the interworking entity, a floor from a push-to-talk over cellular (PoC) system based on the converting; and
    a fifth component for streaming, at the interworking entity, the message to a server in the push-to-talk over cellular (PoC) system upon receipt of the floor.

13. An interworking function, comprising:
    a memory comprising instructions for:
    receiving, at the interworking function, a message from a first terminal in a first
    an instant messaging (IM) system, wherein the message does not include floor signaling;
    queuing the message in a temporary storage;
    converting the message to a streaming format;
    automatically requesting, at the interworking function, a floor from a push-to-talk over cellular (PoC) system;
    streaming, at the interworking function, the message to a server in the a push-to-talk over cellular (PoC) system upon receipt of the floor; and
    a processor in communication with the memory and operable to execute the instructions.

14. The interworking function of claim 13, wherein the interworking function is implemented in an instant messaging (IM) server.

15. The interworking function of claim 13, wherein the interworking function is implemented in a push-to-talk (PoC) server.

16. The interworking function of claim 13, wherein the interworking function is implemented as a separate entity in communication with both an instant messaging (IM) server and a push-to-talk over cellular (PoC) server.

17. The interworking function of claim 13, wherein converting the message to a streaming format is performed in parallel with streaming the message to the server in the push-to-talk over cellular (PoC) system.

18. The interworking function of claim 13, wherein requesting the floor occurs based on completion of the converting.

19. The interworking function of claim 13, further comprising:

releasing the floor; and deleting the message from the temporary storage.

20. The interworking function of claim 13, further comprising: queuing the message if the floor is not granted.

21. The interworking function of claim 13, further comprising:

wherein the instructions for receiving further comprise instructions for receiving a plurality of messages from a plurality of terminals;

instructions for queuing the plurality of messages;

wherein the instructions for requesting the floor further comprise instructions for requesting for a first one of the plurality of messages;

instructions for releasing the floor for the first one of the plurality of messages; and instructions for requesting the floor for a second one of the plurality of messages based on the releasing.

* * * * *